(12) United States Patent
Noyel

(10) Patent No.: US 9,002,093 B2
(45) Date of Patent: Apr. 7, 2015

(54) METHOD OF MONITORING THE APPEARANCE OF THE SURFACE OF A TIRE

(75) Inventor: Guillaume Noyel, Clermont-Ferrand (FR)

(73) Assignees: Compagnie Generale des Etablissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 263 days.

(21) Appl. No.: 13/642,440

(22) PCT Filed: Mar. 4, 2011

(86) PCT No.: PCT/EP2011/053284
§ 371 (c)(1),
(2), (4) Date: Jan. 25, 2013

(87) PCT Pub. No.: WO2011/131410
PCT Pub. Date: Oct. 27, 2011

(65) Prior Publication Data
US 2013/0129182 A1    May 23, 2013

(30) Foreign Application Priority Data

Apr. 19, 2010  (FR) ..................................... 10 52951

(51) Int. Cl.
G06K 9/00       (2006.01)
G06T 7/00       (2006.01)

(52) U.S. Cl.
CPC ..... *G06T 7/0004* (2013.01); *G06T 2207/30108* (2013.01)

(58) Field of Classification Search
USPC ............ 382/141, 143, 149, 152, 224; 348/86, 348/92
See application file for complete search history.

(56) References Cited

U.S. PATENT DOCUMENTS

| | | | |
|---|---|---|---|
| 6,155,110 A * | 12/2000 | Lightner et al. | 73/146 |
| 6,397,615 B1 * | 6/2002 | Kawai et al. | 62/244 |
| 6,775,663 B1 * | 8/2004 | Kim | 1/1 |
| 8,168,380 B2 * | 5/2012 | Chan | 435/6.1 |

(Continued)

FOREIGN PATENT DOCUMENTS

| | | |
|---|---|---|
| JP | 2000-222572 | 8/2000 |
| JP | 2003-085536 | 3/2003 |

(Continued)

OTHER PUBLICATIONS

P. Chen et al., "Inspection of Tire Tread Defects using Image Processing and Pattern Recognition Techniques", Proceedings of the International Society for Optical Engineering, vol. 2063, pp. 14-21 Sep. 9, 1993.

(Continued)

*Primary Examiner* — Yosef Kassa
(74) *Attorney, Agent, or Firm* — Cozen O'Connor

(57) ABSTRACT

Method for detecting an anomaly on the surface of a tire comprising the following steps in the course of which: A—the image of a given anomaly present on the surface of at least one tire is produced, B—with the aid of a collection of filters, a multivariate image of the said surface is constructed in a space of the filters, in which each pixel is represented in the form of a pixel vector, the components of each pixel vector having a value corresponding to the value of this pixel in the image transformed with the aid of each of the filters of the said collection, C—with the aid of a linear function, this multivariate image is transformed from the space of the filters into a spectral space of given dimension whose variables are the filters or combinations of filters of the said collection, so as to form a spectral image, D—a classifier is constructed by determining, for this anomaly, those zones representative of the spectral space which contain, in a statistically representative manner, the points of the spectral image of the said anomaly transformed into the said spectral space.

15 Claims, 3 Drawing Sheets

(56) References Cited

U.S. PATENT DOCUMENTS

| | | | |
|---|---|---|---|
| 8,423,228 B2* | 4/2013 | Oshiro | 701/29.1 |
| 8,737,747 B2* | 5/2014 | Bulan et al. | 382/224 |
| 2005/0052637 A1 | 3/2005 | Shaw et al. | |
| 2009/0080703 A1 | 3/2009 | Hammerschmidt et al. | |
| 2012/0082384 A1 | 4/2012 | Kaneda et al. | |

FOREIGN PATENT DOCUMENTS

| | | |
|---|---|---|
| JP | 2007-287071 | 11/2007 |
| JP | 2009-122939 | 6/2008 |
| JP | 2008-186303 | 8/2008 |

OTHER PUBLICATIONS

D. Colbry et al., "Pattern Recognition for Classification and Matching of Car Tires", Tire Society Meeting—Tire Science and Technology, XP002604321.

I. K. Fodor, "A survey of dimension reduction techniques", U.S. Department of Energy UCRL-ID-148494, May 9, 2002, XP002604322.

* cited by examiner

METHOD OF MONITORING THE APPEARANCE OF THE SURFACE OF A TIRE

RELATED APPLICATIONS

This is a U.S. National Phase Application under 35 USC 371 of International Application PCT/EP2011/053284 filed on Mar. 4, 2011.

This application claims the priority of French application no. 10/52951 filed Apr. 19, 2010, the entire content of which is hereby incorporated by reference.

FIELD OF THE INVENTION

The invention relates to the field of the manufacture of tires, and more particularly the operations for monitoring the exterior or interior appearance of the tires during or at the end of the manufacturing process, with the aim of determining their conformity with respect to monitoring references established with a view to the use which will be made of the said tire.

BACKGROUND OF THE INVENTION

The increase, at constant cost, in computer calculation power, is permitting the development on an industrial scale of automatic monitoring means intended especially to assist operators responsible for visual monitoring. These means call greatly upon image processing techniques whose performance, in terms of speed of analysis and definition, depends greatly on the calculation power used.

The methods employed to perform such processing consist, as a general rule, in comparing a two-dimensional or preferably three-dimensional image of the surface of the tire to be inspected with a two-dimensional or preferably three-dimensional reference image of the surface of the said tire. For this purpose, one seeks to match the image or the surface of the tire to be inspected and the image or the reference surface, for example, by superimposing them, and manufacturing anomalies are determined by analysing the differences between the two images or the two surfaces.

However, these methods do not allow the detection of surface defects that have no noticeable impact on the geometry of the said surface.

Hence, manufacturers are endeavouring to develop image analysis methods, complementary to the methods mentioned hereinabove, that are able to pick out anomalies present on the surface of the casing. These anomalies, whose dimensions are small, are manifested by a particular coloration, an abnormal shape, or else a particular and unusual spatial distribution, and are embedded in the global image of the tire surface, in which they may merge into one. Moreover, their occurrence is random on the surface of a tire or from one tire to another. This gives rise to a paucity of meaningful information making it possible to determine numerical protocols.

Thus, publication EP 2 034 268 calls upon the technique of wavelets to detect repetitive structures such as ply cords apparent on the interior surface of tires.

Publication EP 2 077 442 proposes a method for selecting filters that are able to digitally process the image of the surface of a tire and which are sensitive to a particular defect. This method for selecting filters calls upon the known procedures of texture analysis, and proposes to select the filters by a so-called genetic selection method. This method consists in varying in a statistical manner a collection of filters chosen beforehand, and in measuring with the aid of a cost function, the sensitivity of this modification on the detection of a defect identified beforehand, with respect to the initial collection of filters.

This method, which requires a lengthy and expensive training phase, presents the drawback, however, of not giving certainties about the convergence of these successive iterations on the one hand, and about the elimination of local optimums on the other hand.

SUMMARY OF THE INVENTION

One aspect of the invention is directed to a method of digital processing of the image of the surface of a tire by texture analysis, in which a combination of filters able to identify the signature of the image of an anomaly present on the surface of the tire is selected and which makes it possible to circumvent the drawbacks mentioned hereinabove.

This method for detecting an anomaly on the surface of a tire comprises the following steps in the course of which:

A—the image of a given anomaly present on the surface of at least one tire is produced, B—with the aid of a collection of filters, a multivariate image of the said surface is constructed in a space of the filters, in which each pixel is represented in the form of a pixel vector, the components of each pixel vector having a value corresponding to the value of this pixel in the image transformed with the aid of each of the filters of the said collection, C—with the aid of a linear function, this multivariate image is transformed from the space of the filters into a spectral space of given dimension whose variables are the filters or combinations of filters of the said collection, so as to form a spectral image, D—a classifier is constructed by determining, for this anomaly, those zones representative of the spectral space which contain, in a statistically representative manner, the points of the spectral image of the said anomaly transformed into the said spectral space.

This digital analysis method makes it possible to identify in a statistical manner those zones of a space in which the image of a given anomaly transformed with the aid of a collection of filters are located.

The method for detecting an anomaly on the surface of an arbitrary tire on the surface of which one seeks to detect the presence or the absence of the said anomaly then comprises the operations in the course of which:

a digital image is produced of all or part of the said surface of the said tire to be sorted, the multivariate image of the tire to be sorted, of the said image of the tire to be sorted with the aid of the collection of filters, is determined in the space of the filters, the spectral image of the tire to be sorted is formed, by transforming, with the aid of the linear transformation, the multivariate image of the tire to be sorted, and the location of the points of the spectral image of the tire to be sorted is analysed in the spectral space, with respect to the zones of the spectral space that are representative of the anomaly and which are identified with the aid of the said classifier.

In a preferential manner, in the course of step D, the classifier is constructed by using a method of linear discriminant analysis type, the said representative zones being delimited by hypersurfaces of the said factorial space.

According to a first variant of execution of the invention, it is then entirely possible to implement the method according to the invention by considering that the space of the filters forms the said spectral space and that the spectral image corresponds to the multivariate image, obtained on the basis of an initial collection of filters.

However, the implementation of the method under these conditions may exhibit a few difficulties of implementation because of the large number of data to be manipulated, and because also of the absence of a common metric between the various directions of the spectral space leading to a sometimes difficult statistical interpretation during the construction of the classifier.

Hence, in a preferential manner it will be sought to construct a suitable metric adapted to the statistical analysis in the spectral space, and to reduce the number of variables by judiciously selecting the axes of the spectral space and the filters of the initial collection.

The determination of the suitable metric consists, on completion of step B and before undertaking step C in searching with the aid of a method for analysing the data for a factorial space of dimension less than or equal to the dimension of the space of the filters, in which the transformed variables are decorrelated or independent, and in determining the linear transformation making it possible to pass from the space of the filters to the said factorial space.

To improve the construction of the classifier it is usefully possible to produce, in the course of step A, the image of a given anomaly present on the surface of a series of several different tires, making it possible in the course of step B to determine the multivariate image of each of these images and, in step C, to construct a single multivariate image by assembling the multivariate images obtained on the basis of this series of images.

Preferably, the data analysis is carried out according to a method of principal component analysis type, or according to a method of factorial correspondence analysis type, or according to a method of independent component analysis type.

This series of operations makes it possible to greatly improve the construction of the classifier and it is also possible, according to a second variant of execution of the invention, to implement the method, in which the factorial space forms the said spectral space and in which the spectral image is obtained by transforming the multivariate image, obtained on the basis of the initial collection of filters, into the factorial space with the aid of the linear transformation.

When the number of filters of the initial collection remains too sizable it may turn out to be desirable to reduce the number of filters and to reduce the dimensions of the spectral space so as to lighten the digital processing.

Hence, on completion of step C, with the aid of a first selection method, it is possible to usefully determine the most relevant factorial axes with respect to the multivariate image transformed into the factorial space with the aid of the linear transformation. The description of the said multivariate image is then limited to the coordinates of the said image, expressed on these axes alone, whose number is less than the number of axes of the factorial space, so as to obtain a reduced factorial space.

In a preferential manner, the first method for selecting the factorial axes consists in preserving the factorial axes for which the sum of their inertias with respect to the cluster of points of the multivariate image of the anomaly transformed into the factorial space represents a given percentage of the inertia of the set of axes with respect to the said cluster of points.

In an alternative manner, the first method for selecting the factorial axes consists in preserving the factorial axes having the largest signal-to-noise ratio contained in the factors associated with the pixel vectors of the multivariate image transformed into the factorial space with respect to the said axes considered.

After having determined the relevant factorial axes, this reduction and simplification step is continued by projecting the initial collection of filters into the said reduced factorial space. Next, with the aid of a second selection method, the filters of the initial collection that are projected into the factorial space and whose vectors are furthest from the origin of the factorial axes are determined, so that the number of filters of the initial collection is reduced, and the coordinates of the image in the reduced factorial space are recalculated.

In a preferential manner, those filters are selected for which the quadratic sum of their distances from the origin represents a given percentage of the quadratic sum of the distances with respect to the origin of the set of filters of the initial collection that are projected into the said reduced factorial space, or for which the square of their distance from the origin divided by the sum of the squares of the distances from the origin of the set of filters of the initial collection that are projected into the said reduced factorial space is greater than the inverse of the number of filters (I/L).

According to a third variant of execution of the invention, the method is then applied in which the reduced factorial space forms the said spectral space and in which the spectral image is obtained by transforming the multivariate image, obtained on the basis of the reduced collection of filters, into the reduced factorial space with the aid of the linear transformation.

Another aspect of the invention is directed to a device for monitoring and detecting an anomaly on the surface of a tire comprising:

lighting and picture-taking means able to produce the image of the surface or of a portion of the surface of a tire, and calculation means able to store for one or more given anomalies one or more collections of morphological filters, determined according to one of the variants of implementation of the invention previously described, to transform an image of the surface of the tire to be sorted into a spectral image with the aid of a linear transformation ($\zeta$) according to one of the variants of implementation of the invention previously described, to determine the presence or the absence of any anomaly on the surface of the tire to be sorted with the aid of a classifier according to one of the variants of implementation of the invention previously described.

DETAILED DESCRIPTION OF THE DRAWINGS

The detection method according to an embodiment of the invention comprises two distinct steps in the course of which are determined, successively, a factorial space, a transformation function and a classifier which are able to reveal the presence or the absence of the anomaly and that will be regarded as a training phase, and a detection step proper, for detecting the said anomaly on the surface of an arbitrary tire to be sorted.

The training phase begins with the selection of at least one tire comprising a given anomaly visible on its surface. This type of anomaly may be for example a moulding defect, a grease stain, a reinforcement wire deviation or creep of the rubbers placed under the reinforcement plies, foreign matter etc. A two-dimensional black and white image of the said anomaly is then produced.

As will be seen subsequently, it is possible to render this training phase more robust by producing a series of two-dimensional images of the said anomaly present on the surface of several different tires.

It would also be entirely possible to implement the invention by working on the basis of the colour image of the surface of the tire. However, this possibility offers a fairly reduced field of application because of the relatively monochrome character of tires, in general black. But it is not out of the question that this situation may change, in which case the nature of the filters of the initial collection should be adapted accordingly, taking into account the colour variations.

Figure 1:
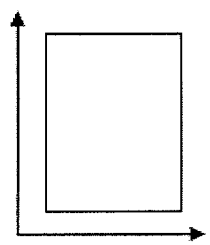
FIG. 1 represents a two-dimensional grey-level image.

As a general rule, the two-dimensional image of the surface of a tire is a grey-level image, such as represented in FIG. 1, in which, with any point or pixel x=(i, j) of the plane (E=[1, 2, . . . ]×[1, 2, . . . ], with E ⊂ R²) represented in the form of a point grid (that is to say a 2D array), is associated a value $f(x) \subset T$ with $T \subset R$ for the grey-level images. Generally, T consists of integer values lying between 0 and 255 with:

$$f : \begin{cases} E \to T \\ x \to f(x) \end{cases}$$

White corresponds to the value 255, and black to the value 0. The other values (i.e. the intermediate grey levels) lie between these two values. It would also be possible to produce a colour or multispectral image of the surface of the tire.

The implementation of the invention can also be achieved on the basis of the colour image of the surface of the tire via an adaptation, not forming part of the present description, of the calculations set forth hereinafter.

A collection of filters, more commonly dubbed morphological filters, is then selected. A morphological filter, within the meaning of the present description, is defined as a function F which makes it possible to transform a grey-level image $f$ into another image $F(f)$. The starting space of the filter is therefore the set of values of the image of E in T, A(E,T)

$$F : \begin{cases} A(E, T) \to A(E, T) \\ f \to F(f) \end{cases}$$

The response image of the filter can likewise be viewed as a function which, with a pixel of E associates a grey level:

$$F^f : \begin{cases} E \to T \\ x \to F^f(x) = [F(f)](x) \end{cases}$$

Among the filters to be used, it is possible to select by way of nonlimiting examples, morphological filters such as series of morphological openings and closures of increasing sizes, morphological dilatations or erosions, or else filters of the wavelet type which make it possible to analyse the position and the frequency of the objects making up the image, or curvelets which make it possible to analyse the position, the frequency and which adapt to the discontinuity of the objects making up the image.

A morphological filter is therefore defined as an increasing and idempotent transformation on a lattice. Here, the term lattice is intended to mean a partially ordered set in which it is possible to order certain of its elements, and in which each pair of elements has an infimum (largest lower bound) and a supremum (smallest upper bound). A transformation ψ is increasing if it preserves the order relation between the images, or else the function ψ is increasing when: ∀$f$, g, $f \le g \Rightarrow \psi(f) \le \psi(g)$.

A transformation ψ is idempotent if the application of this transformation twice in succession to an image is equivalent to applying it once: ψ is idempotent ⇔ ψ∘ψ=ψ

A structuring element is a (small) set used to probe the image studied, it is possible to view it as a tool which would make it possible to erode (i.e. remove material) or to dilate (i.e. add material) to an image. Thus, the dilatation of the function $f$ (i.e. the grey-level image) under a structuring element B, denoted $\delta_B(f)$, is the function which gives to every pixel x∈E the maximum value of the image $f$ in the observation window defined by B such that: $\delta_B(f)(x)=\sup\{f(x-y), y \in B\}$.

And in the same manner, the erosion of the function $f$ (i.e. the grey-level image) under the structuring element B, denoted $\delta_B(f)$, is the function which gives to every pixel x∈E the minimum value of the image $f$ in the observation window defined by B:

$$\delta_B(f)(x)=inf\{f(x-y), y \in B\}.$$

A morphological opening by addition $\gamma_B$ is defined as the composition of an erosion $\epsilon_B$ with a dilatation $\delta_B$ for a structuring element B such that: $\gamma_B(f)=\delta_B \circ \epsilon_B(f)$.

Likewise, a morphological closure by addition $\phi_B$ is defined as the composition of a dilatation $\delta_B$ with erosion $\epsilon_B$ for a structuring element B such that: $\phi_B(f)=\epsilon_B \circ \delta_B(f)$.

A wavelet is a square summable function on Euclidian space $R^n$ usually oscillating and of zero mean, chosen as multi-scale analysis and reconstruction tool.

It will be observed that the theoretical definitions of the various morphological filters commonly used in this type of analysis are not limiting. Moreover, tweaking the parameters of these transformation functions can give rise to collections of filters comprising several tens, or indeed several hundreds of different filters. A fortiori when the filters take colour variations into account. It may therefore turn out to be useful, as will be seen subsequently, to simplify and to select the filters which are most able to give relevant information in the presence of an image containing the anomaly that one seeks to reveal.

The following step consists in transforming each of these images with the aid of the filters of the initial collection. One then obtains as many images as filters corresponding to the transformation of the starting image under each of the filters of the initial collection.

Figure 2:
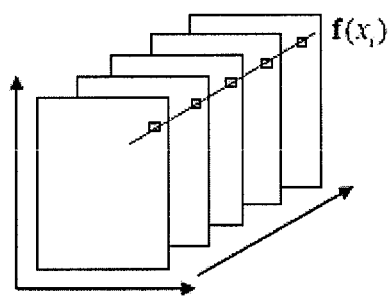
FIG. 2 represents a pixel vector in a multivariate image.
Figure 4:
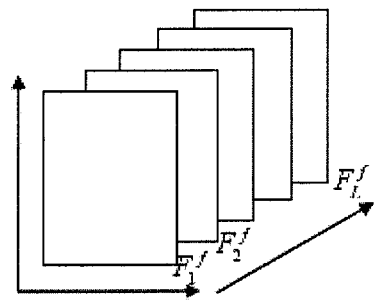
FIG. 4 represents a multivariate image obtained by juxtaposing the responses of the filters.

By assembling these images by superposition, a multivariate image is constructed, in which each pixel contains several values, regarded as a vector of values, as is schematically represented in FIG. 2.

$$f : \begin{cases} E \to T^L \\ x \to f(x) = (f_1(x), f_2(x), \ldots, f_L(x)) \end{cases}$$

is a multivariate image expressed in the space of the filters with
- $E \subset R^2$, $T \subset R$ and $T^L = T \times T \times \ldots \times T$, in which L is the dimension of the image space $T^L$, or space of the filters,
- $x = x_i \backslash i \in \{1, 2, \ldots, P\}$ is the spatial coordinate of the vector pixel $f(x_i)$, P is the number of pixels of E,
- $f_j \backslash j \in \{1, 2, \ldots, L\}$ is a channel (L is also the number of channels), represented hatched in FIG. 4,
- $f_j(x_i)$ is the value of the vector pixel $f(x_i)$ on the channel $f_j$.

Figure 3:
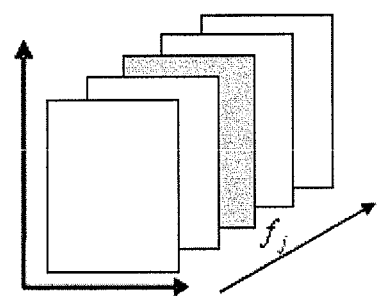
FIG. 3 represents a channel of a multivariate image.

The multivariate images are thus discrete functions, typically with several tens or hundreds of channels, or variables or spectral bands such as represented in FIG. 3. Each pixel of a multivariate image is a vector whose values are associated with an index j corresponding to filter responses. The components of each pixel vector have a value corresponding to the value of this pixel in the image transformed with the aid of each of the filters of the said collection. The arrival image expressed in the space of the filters is then composed of vectors (the pixel vectors) whose variables are the filters of the initial collection.

In the case of the present invention, the multivariate image is obtained as being the juxtaposition of the responses to each of the filters forming the initial collection of filters. $(F_1(f), F_2(f), \ldots, F_L(f))$. This giving in equation form:

$$F^f : \begin{cases} E \to T^L \\ x \to F^f(x) = (F_1^f(x), F_2^f(x), \ldots, F_L^f(x)) = \\ \quad\quad ([F_1(f)](x), [F_2(f)](x), \ldots, [F_L(f)](x)) \end{cases}$$

The multivariate image, such as illustrated in FIG. 4, is obtained through a series of filters applied to the grey-level images $f$. One sometimes speaks of a stack of images which is the response series of each of the filters forming the initial collection.

As was indicated previously it is then possible, onwards of this step, to construct a classifier, according to a method which is explained in detail hereinafter in the present description, by considering the space of the filters as the spectral space, and by regarding the multivariate image obtained with the aid of the initial collection of filters as the spectral image. The transformation $\zeta$ of step C then reduces to a simple identity. However, the application of the method according to the invention to this step of the process for analysing the data is reserved for the case where the number of filters of the initial collection is reduced and where there is not deemed to be any need to undertake now needless simplification phases.

And when the number of filters of the initial collection is sizable, it should be noted that in the absence of any metric and in the absence of independence of the image representation axes in the space of the filters considered to be the spectral space, the statistical analysis implemented in the course of the construction of the classifier can sometimes lead to erroneous interpretations.

It is then recommended that the processing of the data be continued by seeking a factorial space of dimension N less than or equal to the dimension L of the initial space according to the data analysis method used, and in which the variables, here combinations of filters, are as mutually independent as possible. This is equivalent to seeking the maximum variance between the variables associated with each filter.

A linear transformation $\zeta$ making it possible to pass from the initial space or space of the filters to the said factorial space is then determined, and this transformation is applied to the multivariate image $F^f(x) = (F_1^f(x), F_2^f(x), \ldots, F_L^f(x))$ obtained previously so as to obtain a multivariate image of the anomaly $c'(x) = (c'_1^f(x), c'_2^f(x), \ldots, c'_N^f(x))$ expressed in this new factorial space.

The starting image contains very many channels (or axes), that are more or less relevant, it is therefore necessary to select those which are the most relevant for the detection of the anomalies. The benefit of such a transformation is to reduce the dimension of the image so as to reduce the calculation times, while preserving the information that is useful for the rest of the processing. Since, as a general rule, a single filter does not make it possible to discriminate an anomaly with respect to the remainder of the image, the object of the analysis amounts to determining the combinations of filters which will have a response with respect to the presence or to the absence of the said anomaly.

Various methods of Data Analysis exist. It is possible to cite by way of nonlimiting example, Principal Component Analysis (PCA), Factorial Correspondence Analysis (FCA), Independent Component Analysis (ICA) which comprises calculation algorithms better known by their acronyms such as the "Fast ICA" algorithm, the "JADE" algorithm (Joint Approximate Diagonalization of Eigenmatrices) or else the "IFA" algorithm (Independent Factor Analysis), and whose use can also be envisaged.

All these methods, which form part of the general knowledge of the person skilled in the art, seek to render the variables, understood as the direction vectors of the factorial space, as mutually independent as possible. Here, independence is meant in the statistical sense of the term.

In the case of Independent Component Analysis the variables are actually independent, while in the other cases, they are simply decorrelated according to the metric associated with the method used. This metric corresponds to the inverse metric of the variances for Principal Component Analysis, or to the Chi-Squared metric ($\chi^2$) for Factorial Correspondence Analysis.

The implementation of the method of Principal Component Analysis will be described here in greater detail. Indeed, one of the advantages related to Principal Component Analysis is that the directions of high variance contain more information than those of low variance, assuming that the noise is uniformly distributed, which amounts to considering that the directions of high variance have a large signal-to-noise ratio. Moreover, for practical metric reasons, it is possible to centre and reduce the variables of this space of Euclidian type.

To determine this factorial space, F will denote the P×L contingency matrix for representing the multivariate image $F^f$. F is composed of P rows representing the vector pixels (i.e. the individuals) and of L columns (i.e. the channels or the variables) corresponding to the number of filters of the initial collection. The following notation may be used for the matrix calculations:

$$F_{ij} = F_j^f(x_i) \qquad F_j = F_j^f \qquad F_i = F^f(x_i)$$

$$F = \begin{bmatrix} F_{11} & \cdots & F_{1j} & \cdots & F_{1L} \\ \vdots & & \vdots & & \vdots \\ F_{i1} & \cdots & F_{ij} & \cdots & F_{iL} \\ \vdots & & \vdots & & \vdots \\ F_{P1} & \cdots & F_{Pj} & \cdots & F_{PL} \end{bmatrix} \quad F_i$$

$$F_j$$

The row-vectors (i.e. pixel-vectors or individuals) of F are the elements of $T^L$ and are regarded as vectors of $R^L$ where L represents the number of filters of the initial collection ($F_1(f)$, $F_2(f), \ldots, F_L(f)$):

$$F_i = (F_{i1}, \ldots, F_{ij}, \ldots, F_{iL})$$

with $F_i = F^f(x_i)$.

The column-vectors (i.e. channels or variables) of F are elements of $R^P$:

$$F_j = (F_{1j}, \ldots, F_{ij}, \ldots, F_{Pj})$$

with $F_j = F_j^f$.

spatial arrangements between pixels are lost. That is to say only the spectral response of each of the pixels is now of interest.

By way of variant, when it is desired to increase the quality of the training phase, it is possible, as was seen hereinabove, to use the images of an anomaly of the same type, produced on a series s of different tires.

In the course of step B, as previously the multivariate image of each of these images $F^{fcq1}(x)=(F_1^{fcq1}(x), F_2^{fcq1}(x), \ldots, F_L^{fcq1}(x))$, $F^{fcq2}(x)=(F_1^{fcq2}(x), F_2^{fcq2}(x), \ldots, F_L^{fcq2}(x)), \ldots, F^{fcqs}(x)=(F_1^{fcqs}(x), F_2^{fcqs}(x), \ldots, F_L^{fcqs}(x))$ is constructed by stacking the responses to the filters of the initial collection of filters ($F_1(f), F_2(f), \ldots, F_L(f)$).

Next the contingency array of each of these images is constructed:

$$F^{fcq1} = \begin{bmatrix} F_{1,1}^{fcq1} & \cdots & F_{1,j}^{fcq1} & \cdots & F_{1,L}^{fcq1} \\ \vdots & & \vdots & & \vdots \\ F_{i_{CQ1},1}^{fcq1} & \cdots & F_{i_{CQ1},j}^{fcq1} & \cdots & F_{i_{CQ1},L}^{fcq1} \\ \vdots & & \vdots & & \vdots \\ F_{P_{CQ1},1}^{fcq1} & \cdots & F_{P_{CQ1},j}^{fcq1} & \cdots & F_{P_{CQ1},L}^{fcq1} \end{bmatrix}$$

The construction of the contingency array $F^f$ is then carried out by vertically concatenating the contingency arrays of each of the images, by quite simply placing the contingency arrays one below the other.

$$F^f = \begin{bmatrix} F^f_{CQ1} \\ F^f_{CQ2} \\ \cdots \end{bmatrix} = \begin{bmatrix} F_{1,1}^{f_{CQ1}} & \cdots & F_{1,j}^{f_{CQ1}} & \cdots & F_{1,L}^{f_{CQ1}} \\ \vdots & & \vdots & & \vdots \\ F_{i_{CQ1},1}^{f_{CQ1}} & \cdots & F_{i_{CQ1},j}^{f_{CQ1}} & \cdots & F_{i_{CQ1},L}^{f_{CQ1}} \\ \vdots & & \vdots & & \vdots \\ F_{P_{CQ1},1}^{f_{CQ1}} & \cdots & F_{P_{CQ1},j}^{f_{CQ1}} & \cdots & F_{P_{CQ1},L}^{f_{CQ1}} \\ \hline F_{1,1}^{f_{CQ2}} & \cdots & F_{1,j}^{f_{CQ2}} & \cdots & F_{1,L}^{f_{CQ2}} \\ \vdots & & \vdots & & \vdots \\ F_{i_{CQ2},1}^{f_{CQ2}} & \cdots & F_{i_{CQ2},j}^{f_{CQ2}} & \cdots & F_{i_{CQ2},L}^{f_{CQ2}} \\ \vdots & & \vdots & & \vdots \\ F_{P_{CQ2},1}^{f_{CQ2}} & \cdots & F_{P_{CQ2},j}^{f_{CQ2}} & \cdots & F_{P_{CQ2},L}^{f_{CQ2}} \\ \cdots \end{bmatrix} = \begin{bmatrix} F_{1,1} & \cdots & F_{1,j} & \cdots & F_{1,L} \\ \vdots & & \vdots & & \vdots \\ F_{i,1} & \cdots & F_{i,j} & \cdots & F_{i,L} \\ \vdots & & \vdots & & \vdots \\ F_{P,1} & \cdots & F_{P,j} & \cdots & F_{P,L} \end{bmatrix}$$

In indicial notation, the contingency array associated with the image $F^f$ can also be written:

$$F = \{F_{i,j}\}_{i=1\ldots P, j=1\ldots L}$$

It will be observed that, when the pixels $F_j^f(x_i)$ of the multivariate image are placed in the contingency matrix, the where the index $P = \sum_{s=1}^{S} P_{cqs}$ It will be observed here that the contingency arrays of the various images of the anomaly have the same number of columns because of the fact that they are the product of the transformation of an image under the same initial collection of filters. On the other hand, these images may not comprise the same number of pixels, and consequently, the various associated contingency arrays will not have the same number of rows.

It will also be noted that the other methods for analysing data cited hereinabove, the object of all of which is to search for the independent variables in a space of large dimension comprising clusters of points, proceed initially in the same manner and entail the determination of a contingency matrix. These methods are distinguished from one another, as has been mentioned, essentially through the metrics that they use.

The rest of the processing of the contingency array is then the same, depending on whether one considers a single image of a given anomaly, or several concatenated images of the said anomaly, derived from a series s of different tires.

The matrix of the transformed data C is thereafter defined in the same manner:

$$C = \begin{bmatrix} C_{11} & \ldots & C_{1j} & \ldots & C_{1N} \\ \vdots & & \vdots & & \vdots \\ C_{i1} & \ldots & C_{ij} & \ldots & C_{iN} \\ \vdots & & \vdots & & \vdots \\ C_{P1} & \ldots & C_{Pj} & \ldots & C_{PN} \end{bmatrix}$$

The matrix of centred variables is then denoted $X=F-\bar{F}$, i.e. the columns $F_j$ of F are replaced by $F_j-\bar{F}_j$ with $\bar{F}_j$ the mean of $F_j$.

We seek a linear mapping U, which transforms the data X into a matrix C whose columns (variables) are decorrelated: $C=XU$ The matrices X and C may be characterized by their moment of order 1, zero expectations $E[X]=\bar{X}=0$, and $E[C]=\bar{C}=0$, as well as by their moments of order 2 grouped together in their covariance matrices, $\Sigma_X$, $\Sigma_C$.

The covariance matrix of C, $\Sigma_C$ can be decomposed in the following manner:

$$\sum_C = E[(C-\bar{C})(C-\bar{C})^T]$$
$$= E[(CC^T]$$
$$= E[(XU)(XU)^T]$$
$$= U^T E[XX^T]U$$
$$= U^T \sum_X U$$

Principal Component Analysis attempts to find a linear mapping U which maximizes $U^T \Sigma_X U$. That is to say, that if the components (columns) of C are decorrelated, the matrix $\Sigma_X$ is a diagonal matrix. The linear mapping U is therefore formed of the N eigenvectors of the covariance matrix of the centred data $\Sigma_L$.

Consequently, applying a Principal Component Analysis to the data consists in seeking the N eigenvalues and eigenvectors of $\Sigma_X$: $\Sigma_X U = \mu U$ The representation in lower dimension of the vector pixels $F(x_i)$ is obtained by projecting them onto the linear basis spanned by the columns of U: $C=XU$. The column vectors of C are called the principal factors.

It will be observed that, if each of the columns $F_j$ of F is centred and reduced with $$X = \frac{F-\bar{F}}{\sigma_F} \text{ (i.e. } \frac{F_j - \bar{F}_j}{\sigma_{F_j}}\text{)}$$

with $\sigma_{F_j}$ the variance of $F_j$), instead of being centred, we then seek the eigenvalues of the correlation matrix $cor_X$, rather than of the covariance matrix $\Sigma_X$. U is then the matrix of eigenvectors of the correlation matrix also called the inertia matrix.

Moreover, when reduced centred variables are used, the metric between the individuals (i.e. the vector pixels), underlying the Principal Component Analysis, is the metric inverse to the variances:

$$d^2_{1/\sigma^2}(F(x_i), F(x_{i'})) = \sum_{j=1}^{L} \frac{1}{\sigma^2_{F_j}}(F_{ij} - F_{i'j})^2$$

The arrival image space of the transformation $\zeta$ is called the factorial space. This factorial space is composed of direction vectors underpinned by the factorial axes $\Delta_1, \Delta_2, \ldots \Delta_k, \ldots \Delta_N$; and the components, or coordinates of whose pixel vectors in the factorial space, $c'_1, c'_2, \ldots, c'_k, \ldots, c'_N$ which are linear combinations of the filter vectors of the starting space, are the factors associated with the pixel vectors. The cluster of variables (the filters) and of individuals (the pixels) is thus arranged so as to have the maximum dispersion along the factorial axes.

On completion of this analysis step, another space for representing the data of dimension N, equal to or smaller than the dimension L of the starting space of the filters is also obtained, L representing the number of filters of the initial collection. With the aid of the linear transformation $\zeta$, a new multivariate image $c'(x)=(c'_1{}^f(x), c'_2{}^f(x), \ldots, c'_N{}^f(x))$ of dimension N is also obtained, in which the variables $c'_1, c'_2, \ldots, c'_k, \ldots, c'_N$ are linear combinations of filters of the initial collection $(F_1(f), F_2(f), \ldots, F_L(f))$.

In the same manner, the filter vectors of the initial collection of filters have an image in this new factorial space $d'_1{}^f, d'_2{}^f, d'_3{}^f, \ldots d'_L{}^f$.

It is also possible at this juncture to pass directly to the step of constructing the classifier, which consists in determining those zones of the factorial space in which the pixels considered as forming the image of the anomaly are situated in a statistically significant manner. It is then considered that the factorial space forms the spectral space in which the spectral image $c'(x)=(c'_1{}^f(x), c'_2{}^f(x), \ldots, c'_N{}^f(x))$ is obtained through the linear transformation z of the multivariate image $F^f(x)=(F_1{}^f(x), F_2{}^f(x), \ldots, F_L{}^f(x))$ obtained with the aid of the initial collection of filters $(F_1(f), F_2(f), \ldots, F_L(f))$.

As was stated above, it is often desirable to undertake new simplifications by reducing the dimensions and the variables of the factorial space with the aim of lightening the calculations and of improving the identification of the zones representative of the anomaly in the factorial space. Indeed, it is observed that when the factorial spaces have a large number of dimensions, they are often filled with void, or stated otherwise with zones which are not very dense with regard to useful information.

It is then recommended that the dimensions of the factorial space be reduced again, so as to reduce the number of factorial axes, and that the number of filters be restricted to to those responding positively to the anomaly.

Accordingly, the most significant factorial axes $\Delta_i$ are selected to describe the coordinates $c'_1, c'_2, \ldots, c'_k, \ldots, c'_N$ of the multivariate image such as represented in the factorial space after transformation by the function $\zeta$.

The simplest method consists in classing the factorial axes $\Delta_1$ according to their decreasing inertia with respect to the cluster of points formed by the multivariate image in the factorial space. Only the factorial axes for which the sum of their inertias represents for example 80% of the total inertia are then retained.

Another method consists in selecting the axes as a function of the signal-to-noise ratio measured by calculating the covariance on the channels of C. The variance of the noise corresponds to the height of the spike at the origin, and the variance of the signal corresponds to the amplitude of the covariance at the origin after removing the noise spike.

This consists in calculating the Signal-to-Noise Ratio (SNR) on the images of the pixel factors and in preserving only those having an SNR greater than a given threshold.

$$SNR = \frac{\text{var(signal)}}{\text{var(noise)}}$$

To determine the SNR, we calculate the centred spatial covariance on the images of the pixel factors. The variance of the noise corresponds to the amplitude of the spike at the origin. This spike is removed by a morphological opening with a square structuring element of small size such as a square of 3×3 pixels. The variance of the signal is the amplitude of the covariance at the origin after morphological opening. The spatial covariance is defined by the following equation: $\overline{g_k}(h) = E[\overline{c'_k}(x)\overline{c'_k}(x+h)]$, with $\overline{c'_k}(x)$, the centred channel k of the image of the factors c'. The centred channel is obtained by subtracting its mean from it: $\overline{c'_k}(x) = c'_k(x) - E[c'_k(x)]$, where E is the mathematical expectation of a random variable, that is to say its mean.

These selection methods make it possible to preserve just the axes alone, and therefore just the most relevant components $c'_k$. We therefore obtain a data representation space of smaller dimension, described by the factors $c'(x) = (c'_1(x), c'_2(x), \ldots, c'_K(x))$ with (K<N), which are the coordinates of this image on just the axes $\Delta_1, \Delta_2, \ldots \Delta_k, \ldots \Delta_K$ retained in the course of this selection.

Figure 6:
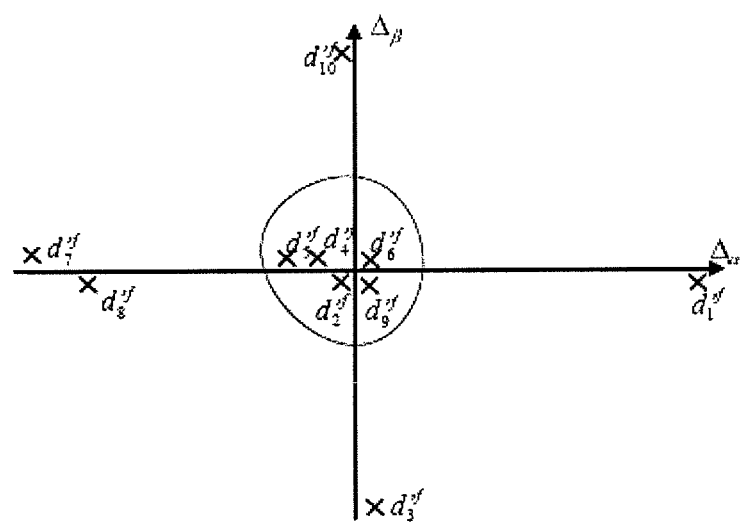
FIG. 6 represents an illustration of the mode of selection of the filters in the factorial space.

The last step of reducing the space consists in selecting the filters of the starting collection responding significantly to the anomaly, and whose coordinates in the factorial space thus reduced are the factors associated with the filters represented in the form of vectors of $R^K$, $d'^f_1, d'^f_2, d'^f_3, \ldots d'^f_L$ in the reduced factorial space. The benefit is to reduce the number of filters to be calculated while obtaining a good approximation of the factorial space. Accordingly, we measure the distance between the factorial axes $\Delta_k$ of the new space and the variables (the filters) represented in the form of points in the factorial space, as is illustrated in a simplified manner in FIG. 6 where the factorial space has been reduced to a two-dimensional space. The filters furthest from the origin of the factorial axes are then retained ($d'^f_1, d'^f_3, d'^f_7, d'^f_8, d'^f_{10}$), and the filters closest to the origin ($d'^f_2, d'^f_4, d'^f_5, d'^f_6, d'^f_9$) are eliminated.

As previously, we retain only the filters whose distance from the origin is greater than a given threshold or else the filters for which the quadratic sum of their distances from the origin represents, for example 80% of the quadratic sum of the distances with respect to the origin of the set of filters of the initial collection, projected into the reduced factorial space ($d'^f_1, d'^f_2, d'^f_3, \ldots d'^f_L$). A reduced initial collection of filters $F_1(f), F_2(f), \ldots, F_n(f), \ldots, F_M(f)$ is then obtained with M less, or indeed much less than L.

In an alternative manner, it is also possible to transform the initial collection of filters ($F_1(f), F_2(f), \ldots, F_L(f)$) in the reduced factorial space ($d'^f_1, d'^f_2, d'^f_3, \ldots d'^f_L$) and, in this space, we select the filters of the initial collection ($F_1(f), F_2(f), \ldots, F_n(f), \ldots, F_M(f)$) for which the square of their distance from the origin divided by the sum of the squares of the distances from the origin of the set of filters of the initial collection that are projected into the said reduced factorial space is greater than the inverse of the number of filters (1/L).

Figure 5:
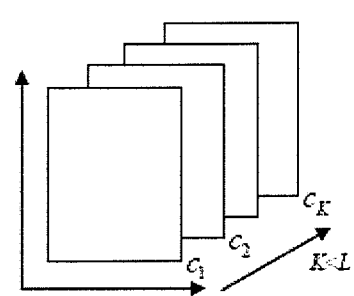
FIG. 5 represents the multivariate image in the reduced factorial space.

We then recalculate the values of the components of the reduced multivariate image in the reduced factorial space $c_1, c_2, \ldots, c_k, \ldots, c_K$ (see FIG. 5), taking into account only the filters of the reduced initial collection just determined.

The number of axes and the number of filters having been reduced, the linear function C determined during the Principal Component Analysis is applied again to the starting image considered to be the multivariate image of the anomaly obtained by transformation with the aid solely of the reduced collection of filters $F_1(f), F_2(f), \ldots, F_n(f), \ldots, F_M(f)$, so as to obtain a multivariate image $c(x) = (c_1(x), c_2(x), \ldots, c_K(x))$ in the factorial space of reduced dimension whose variables $c_1, c_2, \ldots, c_k, \ldots, c_K$ are combinations of filters of the reduced initial collection that are placed in the reduced factorial space composed of the previously selected factorial axes $\Delta_1, \Delta_2, \ldots \Delta_k, \ldots \Delta_K$.

It will be pointed out here that the result obtained, namely a linear transformation $\zeta$, a space comprising a limited number of axes $\Delta_1, \Delta_2, \ldots \Delta_k, \ldots \Delta_K$ and a reduced number of filters $F_1(f), F_2(f), \ldots, F_n(f), \ldots, F_M(f)$, may be achieved in the same manner with a single image of the anomaly or with a set of images of the said anomaly, derived from several different tires. Only the initial calculations are affected thereby during the determination of the contingency array. On the other hand, this additional calculation step at the start of step C makes it possible to render the analysis of the anomalies more reliable.

At this juncture the implementation of the method according to the invention can be carried out by considering that the reduced factorial space forms the said spectral space. The spectral image is the result of transforming the multivariate image ($F^f(x) = (F_1^f(x), F_2^f(x), \ldots, F_M^f(x))$), obtained on the basis of the reduced collection of filters ($F_1(f), F_2(f), \ldots, F_n(f), \ldots, F_M(f)$), into the reduced factorial space with the aid of the linear transformation ($\zeta$).

The method then makes provision to construct a classifier which will make it possible to detect the presence (or the absence), as well as the position of the anomaly. The classifier makes it possible to isolate certain zones of the spectral space formed by the space of the filters, by the factorial space or preferably by the reduced factorial space, in which the clusters of points corresponding to the spectral image of the said anomaly obtained by projecting the multivariate image with the aid of the linear transformation $\zeta$ are situated in a significant manner.

In the present case, the term significant refers to the results of a statistical analysis making it possible to identify those zones of the spectral space in which the said clusters of points are situated. We are indeed able to distinguish the pixels or grouping of pixels situated on the anomaly and those which are placed on a zone of the image devoid of any anomaly. The statistical analysis will therefore consist in searching for those zones of the spectral space in which these two classes of pixels are preferably situated.

The most appropriate method consists in applying a method of analysis based on a linear discriminant analysis, better known by its acronym LDA, and a brief reminder of which will be given hereinafter. The object of this method of analysis is to separate classes of points by hypersurfaces, by assuming that the distribution of the points in a class is Gaussian. This works well in very many cases, even if the points of the classes do not have an entirely Gaussian spread. LDA can of course be used in multidimensional spaces.

Classifying amounts to determining the joint probabilities, $Pr(G|X)$, of the classes $G=k$ knowing the data $X=x$. Let us assume that $f_k(x)$ is the conditional distribution of the data $X$ in the class $G=k$ and let $\pi_k$ be the a priori probability of class k, with $\Sigma_{k=1}^{K}\pi_k=1$. Bayes' theorem gives:

$$Pr(G=k \mid X=x) = \frac{f_k(x)\pi_k}{\sum_{l=1}^{K} f_l(x)\pi_l}.$$

In terms of classification, knowing $Pr(G=k|X=x)$ amounts to knowing $f_k(x)$. Let us assume that the distribution of each of the classes is modelled as a multivariate Gaussian:

$$f_k(x) = \frac{1}{(2\pi)^{p/2}|\Sigma_k|^{1/2}} e^{-\frac{1}{2}(x-\mu_k)^T \Sigma_k^{-1}(x-\mu_k)},$$

with $\mu_k$ the mean of class k.

It is also assumed that all the classes have the same covariance matrix: $\Sigma_k^{-1} = \Sigma \forall k$. By comparing two classes and by using the logarithm of the ratio, we obtain a linear equation in x:

$$\log\frac{Pr(G=k \mid X=x)}{Pr(G=l \mid X=x)} = \log\frac{f_k(x)}{f_l(x)} + \log\frac{\pi_k}{\pi_l}$$

$$= \log\frac{\pi_k}{\pi_l} - \frac{1}{2}(\mu_k + \mu_l)^T \sum\nolimits^{-1}(\mu_k - \mu_l) +$$

$$x^T \sum\nolimits^{-1}(\mu_k - \mu_l)$$

This equation is that of the boundary between the classes k and l. It is the equation of a hyperplane in dimension p. The classes of points will thus be separated by hyperplanes.

From the above equation, we deduce the linear discriminating functions which are equivalent to the decision rule, with $G(x) = \mathrm{argmax}_k \delta_k$:

$$\delta_k(x) = x^T \Sigma^{-1}\mu_k - \frac{1}{2}\mu_k^T \Sigma^{-1}\mu_k + \log \pi_k$$

Since in practice we do not know the parameters of the Gaussian distributions, they are estimated by considering the location of the pixels or grouping of pixels considered, as representative of the anomaly and the location of the pixels considered as belonging to a healthy part of the surface:

$\hat{\pi}_k = N_k/N$, where $N_k$ is the number of individuals in class k;
$\hat{\mu}_k = \Sigma_{g_i=k} x_i/N_k$, where $g_i$ is the class of an individual;
$\hat{\Sigma} = \Sigma_{k=2}^{K} \Sigma_{g_i=k}(x_i - \hat{\mu}_k)^T/(N-K)$.

When the covariance matrices are not of equal dimensions, the discriminating functions $\delta_k(x)$ are of quadratic form and the method of Quadratic Discriminant Analysis is then invoked, the zones are then separated by quadratic hypersurfaces rather than by hyperplanes.

Once these parameters have been determined in a statistical manner, we are then able to identify those zones of the spectral space in which the pixels of the spectral image representing a given anomaly will lie in a statistically representative manner. In the event of statistically representative presence of pixels in these zones it will in return be possible to conclude the probability of the presence of an anomaly and to determine the location thereof on the image.

The construction of the classifier can also be carried out in three distinct steps of the implementation of the invention, the steps of which were described hereinabove.

According to a first variant, it is possible to carry out this step by considering that the spectral space is formed by the space of the filters whose direction vectors are those of the canonical basis $\square^2$ associated with the initial collection of filters $(F_1(f), F_2(f), \ldots, F_L(f))$, and that the spectral image corresponds to the multivariate image, obtained with the aid of the initial collection of filters $F^f(x) = (F_1^{f}(x), F_2^{f}(x), \ldots, F_L^{f}(x))$.

According to a second variant, it is also possible to construct the classifier just after the determination of the factorial space and of the transformation function $\zeta$. In this case, the factorial space forms the spectral space and we seek those zones representative of this space which contains, in a statistically representative manner, the points of the spectral image $c'(x) = (c'_1(x), c'_2(x), \ldots, c'_N(x))$ of the said anomaly obtained with the aid of the initial collection of filters $(F_1(f), F_2(f), \ldots, F_L(f))$ and transformed into the factorial space with the aid of the linear transformation $\zeta$.

According to the third variant, the construction of the classifier is carried out after having reduced the number of filters of the initial collection and the dimensions of the factorial space. The reduced factorial space then forms the said spectral space and the spectral image of the anomaly $c(x) = (c_1(x), c_2(x), \ldots, c_k(x), \ldots, c_K(x))$ is obtained by transforming the multivariate image $F^f(x) = (F_1^{f}(x), F_2^{f}(x), \ldots, F_M^{f}(x))$, obtained on the basis of the reduced collection of filters $(F_1(f), F_2(f), \ldots, F_n(f), \ldots, F_M(f))$, into the reduced factorial space with the aid of the linear transformation $(\zeta)$.

The detection of an anomaly on the surface of an arbitrary tire to be sorted then becomes possible by using the calculation tools and the method such as are described hereinabove.

In a first step, the digital grey-level image of the surface of the tire that it is desired to sort is produced.

It may turn out to be practical to cut the surface of the tire to be sorted into smaller surface elements, whose size may correspond substantially to the size of the images of the anomaly that served to construct the analysis tools.

The multivariate image $(F^{ft}(x) = (F_1^{ft}(x), F_2^{ft}(x), \ldots, F_L^{ft}(x))$, $F^{ft}(x) = (F_1^{ft}(x), F_2^{ft}(x), \ldots, F_M^{ft}(x)))$ of the surface or of the surface element of the said tire to be sorted is then determined by using, according to case, the filters of the initial collection, $(F_1(f), F_2(f), \ldots, F_L(f))$ or the selected filters of the reduced collection, $F_1(f), F_2(f), \ldots, F_n(f), \ldots, F_M(f)$, on the elements of the image of the tire to be sorted.

This multivariate image is projected with the aid of the mapping $\zeta$ into the spectral space which may be formed, according to the variants of implementation of the invention adopted, by the space of the filters, by the factorial space or by the reduced factorial space, and in which the classifier has been constructed. The spectral image of the tire to be sorted is then expressed by the pixel factors respectively, $F^{ft}(x) = (F_1^{ft}(x), F_2^{ft}(x), \ldots, F_L^{ft}(x))$, $c'^t(x) = (c'_1{}^t(x), c'_2{}^t(x), \ldots, c'_N{}^t(x))$, $c^t(x) = (c_1{}^t(x), c_2{}^t(x), \ldots, c_k{}^t(x), \ldots, c_K{}^t(x))$ We then observe the position of the cluster of points of the spectral image of the surface or of the surface element of the said tire to be sorted in the spectral space, and we query, with the aid of the classifier, so as to ascertain whether the pixels are distributed in a statistically representative manner in the zones of the spectral space that are delimited by the classifier, and whether (or not) there is potentially a zone of the image of the tire to be sorted which might correspond to the said anomaly.

The method for detecting an anomaly which has just been described is adapted for highlighting a given anomaly present on the surface of a tire.

It therefore goes without saying, that it is necessary to apply the said method as many times as distinct anomalies to be identified.

Figure 7:
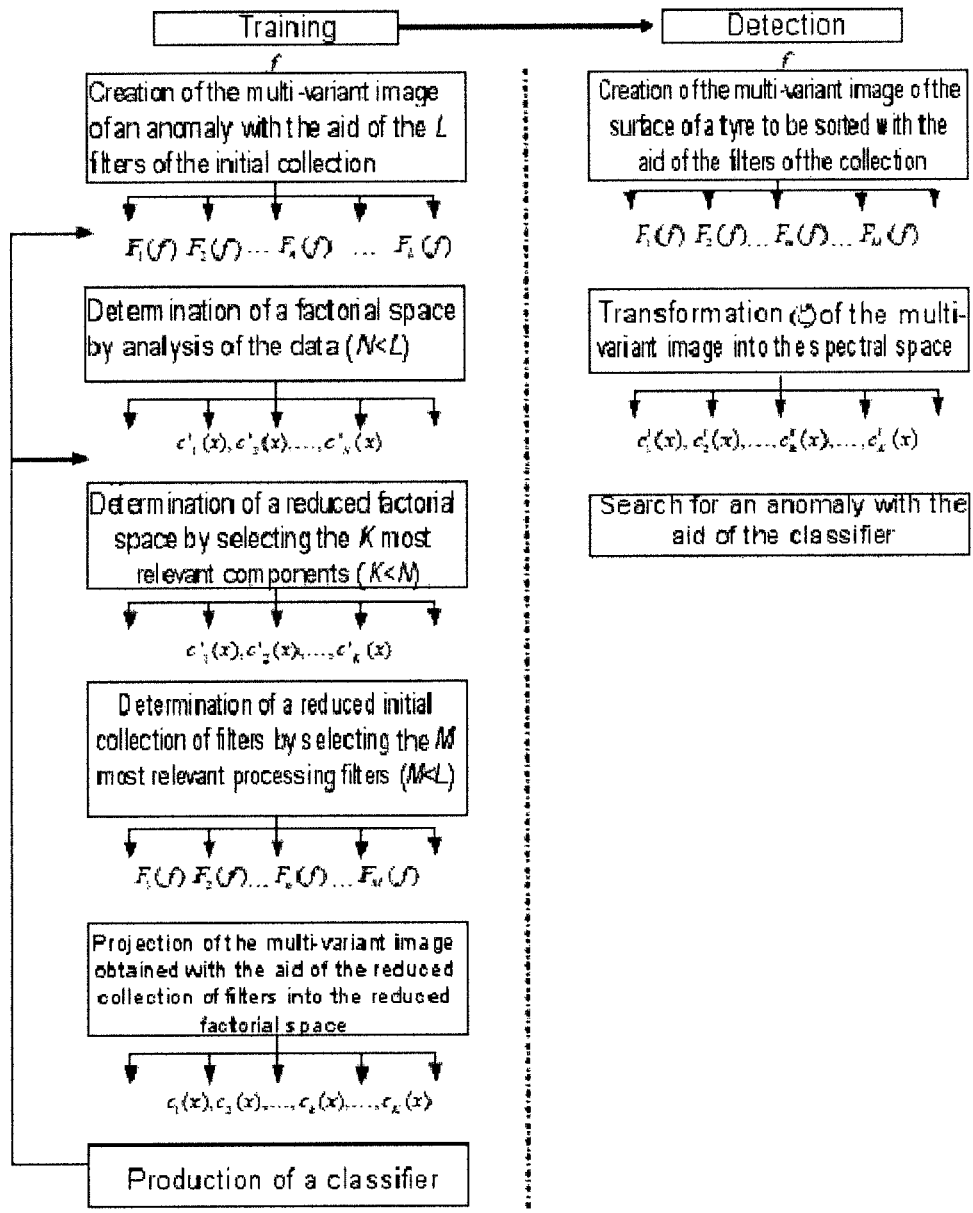
FIG. 7 represents a simplified diagram of the main steps of the method according to an embodiment of the invention.

In practice, this amounts to determining as many sets of filters, spectral spaces and transformation functions $\zeta$ as distinct anomalies to be identified on the surface of the tire and then, in the detection phase, to applying these operators successively, according to the sequence of operations which is described in a simplified manner in FIG. 7, to each surface element so as to detect the presence or the absence of one of these anomalies.

It is also possible to envisage grouping together the images of all the anomalies in the contingency array such as described hereinabove, and to use a classifier comprising as many classes as anomalies or else a classifier with two classes indicating only the presence of an arbitrary anomaly or the absence of any anomaly.

The object of the method described hereinabove is to be applied preferably as regards searching for the anomalies present on the surface of a tire. It turns out to also be particularly useful when seeking to examine a tire's interior surface on which there appear known patterns such as striations or networks of striations formed by the patterns present on the curing membrane with the aim of favouring the flow of the occluded gases. These patterns, which as a general rule are located in a more or less random manner from one tire to another because of the elastic nature of the curing membrane, are not properly speaking anomalies. In this respect, it is appropriate to determine the series of relevant filters for identifying these striations by applying the teachings of the method according to the invention, and then to identify these striations in such a way as not to regard them as anomalies.

The invention claimed is:

1. A method for detecting an anomaly on the surface of a tire by digital processing of the image of the surface of a tire, wherein a combination of filters able to identify the signature of the image of an anomaly present on the surface of the tire is selected comprising the steps in the course of which:

A—the image of a given anomaly present on the surface of at least one tire is produced, B—with the aid of a collection formed of a plurality of filters $((F_1(f), F_2(f), \ldots, F_L(f), (F_1(f), F_2(f), \ldots, F_M(f)))$, a multivariate image $(F^f(x)=(F_1^f(x), F_2^f(x), \ldots, F_L^f(x)), F^f(x)=(F_1^f(x), F_2^f(x), \ldots, F_M^f(x)))$ of the said surface is constructed, in a space of the filters, in which each pixel is represented in the form of a pixel vector $(F^f(x))$, the components of each pixel vector having a value corresponding to the value of this pixel in the image transformed with the aid of each of the filters of the said collection, C—with the aid of a linear function $(\zeta)$, this multivariate image is transformed from the space of the filters into a spectral space of given dimension (L, M) whose variables are the filters or combinations of filters of the said collection, so as to form a spectral image $(F^f(x)=(F_1^f(x), F_2^f(x), \ldots, F_L^f(x)), c'(x)=(c'_1(x), c'_2(x), c'_N(x)), c(x)=(c_1(x), c_2(x), \ldots, c_K(x)))$, D—a classifier is constructed by determining, for this anomaly, those zones representative of the spectral space which contain, in a statistically representative manner, the points of the spectral image of the said anomaly transformed into the said spectral space $(F^f(x)=(F_1^f(x), F_2^f(x), \ldots, F_L^f(x)), c'(x)=(c'_1(x), c'_2(x), \ldots, c'_N(x)) c(x)=(c_1(x), c_2(x), \ldots, c_K(x)))$.

2. The detection method according to claim 1, wherein, to detect an anomaly on the surface of a tire to be sorted, a digital image is produced of all or part of the said surface of the said tire to be sorted, the multivariate image of the tire to be sorted $(F^{ft}(x)=(F_1^{ft}(x), F_2^{ft}(x), \ldots, F_L^{ft}(x)), F^{ft}(x)=(F_1^{ft}(x), F_2^{ft}(x), \ldots, F_M^{ft}(x)))$ of the said image of the tire to be sorted is determined in the space of the filters with the aid of the collection of filters $((F_1(f), F_2(f), \ldots, F_L(f)), (F_1(f), F_2(f), \ldots, F_M(f)))$, the spectral image of the tire to be sorted $(F^{ft}(x)=(F_1^{ft}(x), F_2^{ft}(x)), \ldots, F_L^{ft}(x)), c''(x)=(c''_1(x), c''_2(x), \ldots, c''_K(x)), c'(x)=(c_1'(x), c_2'(x), \ldots, c_K'(x)))$ is formed by transforming, with the aid of the linear transformation $(\zeta)$, the multivariate image $(F^{ft}(x)=(F_1^{ft}(x), F_2^{ft}(x), \ldots, F_L^{ft}(x)), F^{ft}(x)=(F_1^{ft}(x), \ldots, F_M^{ft}(x)))$ of the tire to be sorted, and the location of the points of the spectral image of the tire to be sorted $(F^{ft}(x)=(F_1^{ft}(x), F_2^{ft}(x), \ldots, F_L^{ft}(x)), c''(x)=(c''_1(x), c''_2(x), \ldots, c''_K(x)), c'(x)=(c_1'(x), c_2'(x), \ldots, c_K'(x)))$ is analysed in the spectral space, with respect to those zones of the spectral space that are representative of the anomaly and which were identified with the aid of the said classifier.

3. The detection method according to claim 1, wherein, in the course of step D, the classifier is constructed by using a method of linear discriminant analysis type, the said representative zones being delimited by hypersurfaces of the said factorial space.

4. The detection method according to claim 1, wherein the space of the filters forms the said spectral space and in which the spectral image $(F^f(x)=(F_1^f(x), F_2^f(x), \ldots, F_L^f(x)), (F^{ft}(x)=(F_1^{ft}(x), F_2^{ft}(x), \ldots, F_L^{ft}(x)))$, corresponds to the multivariate image obtained on the basis of an initial collection of filters $((F_1(f), F_2(f), \ldots, F_L(f))$.

5. The detection method according to claim 1, wherein on completion of step B and before undertaking step C, with the aid of a method for analysing the data (PCA, FCA, ICA), a factorial space is sought of dimension (N) less than or equal to the dimension of the space of the filters (L), in which the transformed variables $(c'_1, c'_2, \ldots, c'_k, \ldots, c'_N)$ are decorrelated or independent, and the linear transformation $(\zeta)$ making it possible to pass from the space of the filters to the said factorial space is determined.

6. The detection method according to claim 5, wherein in the course of step A, the image of a given anomaly present on the surface of a series (s) of several different tires is produced, in the course of step B, the multivariate image of each of these images is determined, and in the course of step C, the multivariate images are assembled so as to constitute a single multivariate image.

7. The detection method according to claim 5, wherein the data analysis is carried out according to a method of principal component analysis type, or according to a method of factorial correspondence analysis type, or according to a method of independent component analysis type.

8. The detection method according to claim 5, wherein the factorial space forms the said spectral space and in which the spectral image $(c'(x)=(c'_1(x), c'_2(x), \ldots, c'_N(x)), c''(x)=(c''_1(x), c''_2(x), \ldots, c''_N(x)))$ is obtained by transforming the multivariate image $(F^f(x)=(F_1^f(x), F_2^f(x), \ldots, F_L^f(x)), F^{ft}(x)=(F_1^{ft}(x), F_2^{ft}(x), \ldots, F_L^{ft}(x)))$, obtained on the basis of the initial collection of filters $(F^f(x)=(F_1^f f(x), F_2^f(x), \ldots, F_L^f(x)))$, into the factorial space with the aid of the linear transformation $(\zeta)$.

9. The detection method according to claim 5, wherein on completion of step C, with the aid of a first selection method, the most relevant factorial axes $(\Delta_1, \Delta_2, \ldots \Delta_k, \ldots \Delta_K)$ with respect to the multivariate image transformed into the factorial space with the aid of the linear transformation $(\zeta)$ are determined, and the description of the said multivariate image is limited to the coordinates of the said image $(c'_1(x), c'_2(x), \ldots, c'_k(x), \ldots, c'_K(x))$, expressed on these axes alone, whose number (K) is less than the number of axes (N) of the factorial space, so as to obtain a reduced factorial space.

10. The method according to claim 9, wherein the first method for selecting the factorial axes consists in preserving the factorial axes $(\Delta_1, \Delta_2, \ldots \Delta_k, \ldots \Delta_K)$ for which the sum of their inertias with respect to the cluster of points of the multivariate image of the anomaly transformed into the factorial space $(c'(x)=(c'_1(x), c'_2(x), \ldots, c'_N(x)))$ represents a given percentage of the inertia of the set of axes with respect to the said cluster of points.

11. The detection method according to claim 9, wherein the first method for selecting the factorial axes $(\Delta_1, \Delta_2, \ldots \Delta_k, \ldots \Delta_K)$ consists in preserving the factorial axes having the largest signal-to-noise ratio contained in the factors associated with the pixel vectors of the multivariate image transformed into the factorial space with respect to the said axes considered.

12. The detection method according to claim 9, wherein, after having determined the relevant factorial axes, the initial collection of filters $(F_1(f), F_2(f), \ldots, F_L(f))$ is projected into the said reduced factorial space and those filters of the initial collection that are projected into the factorial space $(d'^f_1, d'^f_2, d'^f_3, \ldots d'^f_L)$ and whose vectors are furthest from the origin of the factorial axes $(\Delta_1, \Delta_2, \ldots \Delta_k, \ldots \Delta_K)$ are determined with the aid of a second selection method, so that the number (M) of filters $(F_1(f), F_2(f), \ldots, F_n(f), \ldots, F_M(f))$ of the initial collection is reduced, and the coordinates of the image $(c(x)=(c_1(x), c_2(x), \ldots, c_k(x), \ldots, c_K(x)))$ are recalculated in the reduced factorial space.

13. The detection method according to claim 12, wherein the filters of the initial collection $(F_1(f), F_2(f), \ldots, F_L(f))$ are projected into the reduced factorial space $(d'^f_1, d'^f_2, d'^f_3, \ldots d'^f_L)$ and, in this space, those filters $(F_1(f), F_2(f), \ldots, F_n(f), \ldots, F_M(f))$ are selected for which the quadratic sum of their distances from the origin represents a given percentage of the quadratic sum of the distances with respect to the origin of the set of filters of the initial collection that are projected into the said reduced factorial space, or for which the square of their distance from the origin divided by the sum of the squares of the distances from the origin of the set of filters of the initial collection that are projected into the said reduced factorial space is greater than the inverse of the number of filters (1/L).

14. The method according to claim 12, wherein the reduced factorial space forms the said spectral space, and in which the spectral image $(c(x)=(c_1(x), c_2(x), \ldots, c_k(x), \ldots, c_K(x)), c'(x)=(c_1'(x), c_2'(x), \ldots, c_K'(x)))$ is obtained by transforming the multivariate image $(F^f(x)=(F_1^f(x), F_2^f(x), \ldots, F_M^f(x)), F^{ft}(x)=(F_1^{ft}(x), F_2^{ft}(x), \ldots, F_M^{ft}(x)))$, obtained on the basis of the reduced collection of filters $(F_1(f), F_2(f), \ldots, F_n(f), \ldots, F_M(f))$, into the reduced factorial space with the aid of the linear transformation $(\zeta)$.

15. A device for monitoring and detecting an anomaly on the surface of a tire to be sorted comprising:
lighting and picture-taking means able to produce the image of the surface or of a portion of the surface of a tire; and
calculation means able
to store for one or more given anomalies one or more collections of morphological filters, determined according to claim 3, to transform an image of the surface of the tire to be sorted into a spectral image with the aid of the linear transformation $(\zeta)$, and
to determine the presence or the absence of any anomaly on the surface of the tire to be sorted with the aid of the classifier.

* * * * *